United States Patent
Massi

(10) Patent No.: US 6,378,454 B1
(45) Date of Patent: Apr. 30, 2002

(54) DEVICE FOR DETECTING, ASSESSING AND SIGNALING THAW OF FROZEN AND DEEP FROZEN FOODSTUFF

(75) Inventor: Nicola Massi, Fermo (IT)

(73) Assignee: Intec S.r.l., Macerata (IT)

( * ) Notice: Subject to any disclaimer, the term of this patent is extended or adjusted under 35 U.S.C. 154(b) by 0 days.

(21) Appl. No.: 09/554,017

(22) PCT Filed: Nov. 10, 1998

(86) PCT No.: PCT/IB98/01792

§ 371 Date: Jun. 5, 2000

§ 102(e) Date: Jun. 5, 2000

(87) PCT Pub. No.: WO99/24799

PCT Pub. Date: May 20, 1999

(30) Foreign Application Priority Data

Nov. 11, 1997 (IT) .......................... BO97A0671

(51) Int. Cl.[7] .................... G01K 11/02; G01K 11/12
(52) U.S. Cl. ....................... 116/219; 116/206
(58) Field of Search .................. 116/219, 217, 116/207, 216; 426/88

(56) References Cited

U.S. PATENT DOCUMENTS

| | | | |
|---|---|---|---|
| 3,243,303 A | | 3/1966 | Johnson ........................ 426/88 |
| 3,844,718 A | * | 10/1974 | Cohen .......................... 422/55 |
| 3,967,579 A | * | 7/1976 | Seiter .......................... 116/219 |
| 4,057,029 A | * | 11/1977 | Seiter .......................... 374/106 |
| 4,148,272 A | * | 4/1979 | Wetzold ....................... 116/219 |
| 4,408,557 A | * | 10/1983 | Bradley et al. .............. 116/206 |
| 4,428,321 A | * | 1/1984 | Arens .......................... 116/217 |
| 4,432,656 A | * | 2/1984 | Allmendinger .............. 374/102 |
| 4,629,330 A | * | 12/1986 | Nichols ........................ 368/89 |
| 4,846,095 A | * | 7/1989 | Emslander ................... 116/206 |
| 5,057,434 A | * | 10/1991 | Prusik et al. .................. 436/2 |
| 5,490,476 A | * | 2/1996 | Veitch et al. ................. 116/217 |

FOREIGN PATENT DOCUMENTS

| | | | |
|---|---|---|---|
| FR | 2244984 | 9/1974 | .......... G01D/21/02 |
| WO | WO 89/00680 | 1/1989 | ............ G01K/3/04 |
| WO | WO 97/11341 | 3/1997 | ............ G01K/3/04 |

* cited by examiner

Primary Examiner—Diego Gutierrez
Assistant Examiner—R. A. Smith
(74) Attorney, Agent, or Firm—William J. Sapone; Coleman Sudol Sapone

(57) ABSTRACT

The device for detecting, assessing and signaling thawing of deep frozen foodstuff includes a stratified disc (1), which can be applied to the product to be checked, and formed by a first support (3), a second support (7) and impermeable transparent films (8,9). A pattern (4), made on the first support (3) and extending up to a central display zone (6), is obtained by application of water expansion facilitating substances. Coloring water-soluble substances, which assume a well seen color when in contact with liquid water, are also applied to the display zone (6). The second support (7) has printed thereon information about the disc (1) use, and allows to see the display zone (6). The transparent and impermeable films, respectively upper (8) and lower (9), are fastened to the upper surface (3b) and to the lower surface (3a) of this first support (3).

8 Claims, 2 Drawing Sheets

DEVICE FOR DETECTING, ASSESSING AND SIGNALING THAW OF FROZEN AND DEEP FROZEN FOODSTUFF

FIELD OF THE INVENTION

The present invention relates to control of foodstuff or perishable products conservation.

In particular, the present invention relates to a device for detecting thawing of frozen or deep frozen foodstuff, i.e. device that indicates that the outer surface of these products has accidentally reached a temperature higher than the thawing temperature, precisely measures duration of this thawing condition and signals the expiration of the period, during which the product organoleptic features remain unchanged.

DESCRIPTION OF THE PRIOR ART

It is known the necessary of maintaining the continuity of so-called "freeze chain" from the foodstuff freezing until its consumption to guarantee the product nutrient, organoleptic and hygienic integrity.

This means that, during the whole conservation period, the products cannot undergo even partial thawing and refreezing.

In fact, interruption of the freeze chain deteriorates foodstuff, causing a considerable decrease of the nutritional value or creating true toxins or proliferation of bacterial colonies.

In each case, consumption of deteriorated products is to be discouraged and moreover, the law forbids sale of deteriorated products.

However, only in some cases and for some products it is possible to detect a momentary thawing and subsequent refreezing.

Empirical signs are e.g. the presence of a layer of ice or frost on the package, certain degree of humidity of the carton package, or scarce rigidity of the touched product. However, these signs cannot give a reliable indication about possibility that the products have undergone a freeze-thaw sequence.

A known technique for detecting that the continuity of the freeze chain in the foodstuff was interrupted, has been described in the Patent Application No. MI92A 000526, filed by the same Applicant.

The above mentioned invention includes a tag, which undergoes irreversible chromatic changes as a result of the contact with liquid water.

The tag can be applied to the inner surface of the transparent cap of a small container filled with a gelatinous aqueous substance, which solidifies in the normal freezing temperature of the preserved product, and with a temperature near to zero grades, it melts and releases liquid water.

The container is usually frozen and then applied to the product also frozen, so the gelatinous substance contained therein is solid.

If in any moment the temperature of the container gets near to zero, the substance contained therein thaws and releases liquid water which wets the tag.

This leads to an irreversible chemical reaction causing the tag color change, which is seen from the outside through the transparent cap.

The above mentioned Patent Application describes different types of substances which react in different chromatic ways with water, and therefore can be advantageously used in this device e.g. by being silk-screen printed or painted on the tag.

Moreover, according to the above mentioned invention, the tag is covered also with surface-active agents or organic solvents.

The above described invention is able to give sufficiently precise information about possible thawing, yet, it is not able to give information about duration of the partial or complete thawing condition.

This information can be very important for a trader or the user, since it allows to understand if either the package only or the package and the product have been subjected to thawing, and if the product characteristics have been changed to such degree as to advise against its consumption.

The European Patent Application No. 003.126 describes a thawing indicator constituted by a strip of absorbent paper provided with a water-soluble substance, which changes color when in contact with liquid water.

This strip is wrapped in a transparent and impermeable film, except for a piece thereof which is situated on one of its ends.

The indicator is applied to the frozen product and absorbs, by its free piece, the water released during the product thawing, if the temperature goes over 0° C.

The gradual color change of the substance contained in the absorbent paper strip indicates approximately the duration of the thaw at the product surface.

A disadvantage of this indicator lies in the fact that the components used and the construction method make the absorbent paper absorb the water rather quickly and thus the indicator reaches the end of scale rapidly.

Moreover, the speed of water expansion in the paper is proportional to the reached temperature, and anyway it is difficult to verify.

This can lead a possible purchaser to negative opinions about the product state also in situations when only the package or the outer layer of frost has undergone thawing and therefore, the product is still absolutely edible.

For example, this occurs normally during wrapping of the product, when the product is put onto a polystyrene tray and then wrapped in a thin impermeable film or during packaging in heat-retractable bags.

In both packaging ways, the packages are heated for a short instance to a temperature near 100° C., which causes immediate thawing of the frost present on the product outer surface, thus activating the above described indicator.

A further known temperature monitor device is disclosed in U.S. Pat. No. 3,243,303. It comprises an absorbent layer, a masking layer overlaying the absorbent layer, an impermeable layer underlying this latter except for end areas, a fluid carrier underlying the impermeable layer and two external transparent layers, enclosing and sealing the device.

The fluid carrier is impregnated with a fluid, containing coloring matter, normally held in a frozen status. When temperature raises above 0° C., the fluid melts or thaws, and is adsorbed by the adsorbent layer, traveling from the end areas to the indicating area and coloring it.

The above device must be constantly held at temperatures under the internal fluid melting temperature, even before its installation in a frozen product.

As a matter of fact, the indicators of this type have not been very successful and have practically disappeared from the market, probably due to the above described disadvantages.

SUMMARY OF THE INVENTION

The object of the present invention is to propose a device which not only detects even minimum thawing in a frozen or deep frozen product, but also visibly signals it in a clear way only when the thaw condition has lasted long enough to make the product not advisable to be sold or used.

Another object of the present invention is to obtain the above mentioned objects by a very cheap and highly reliable device of simple construction and application.

The above mentioned objects are achieved, in accordance with the content of the claims, by a device for detecting, assessing and signaling thawing of deep frozen foodstuff, the device being applied to an area of the product to be checked where liquid water is released during thawing, the device including:

a first support, made of laminar, scarcely permeable material, and having, situated in a lower surface, a pattern extending from an outer edge zone of said first support up to a display zone thereof, said pattern being formed by substances for facilitating water expansion through said pattern and coloring water-soluble substances applied in said display zone;

impermeable transparent films, upper and lower respectively, whose shape is identical to said first support, said upper and lower transparent films being fastened to an upper surface and to a lower surface of said first support, so as to allow water to expand only in said outer edge zone.

According to a different embodiment, the invention proposes a device for detecting, assessing and signaling thawing of deep frozen foodstuff, which includes:

a first support, made of laminar, scarcely permeable material, and having applied to a lower surface and in a display zone, substances facilitating water expansion through said display zone and also coloring water-soluble substances;

impermeable transparent films, upper and lower respectively, whose shape is the same as said first support, said upper and lower impermeable transparent films being fastened to an upper surface and to said lower surface of said first support, said lower film having a hole made in said display zone;

a predetermined quantity of gelatinous adhesive substance, containing water, applied in the region of said hole for fastening said device to a package of frozen products.

BRIEF DESCRIPTION OF THE DRAWINGS

The characteristic features of the present invention are pointed out in the following, with particular reference to the enclosed tables of drawings, in which.

BEST MODE OF CARRYING OUT THE INVENTION

Figure 1:
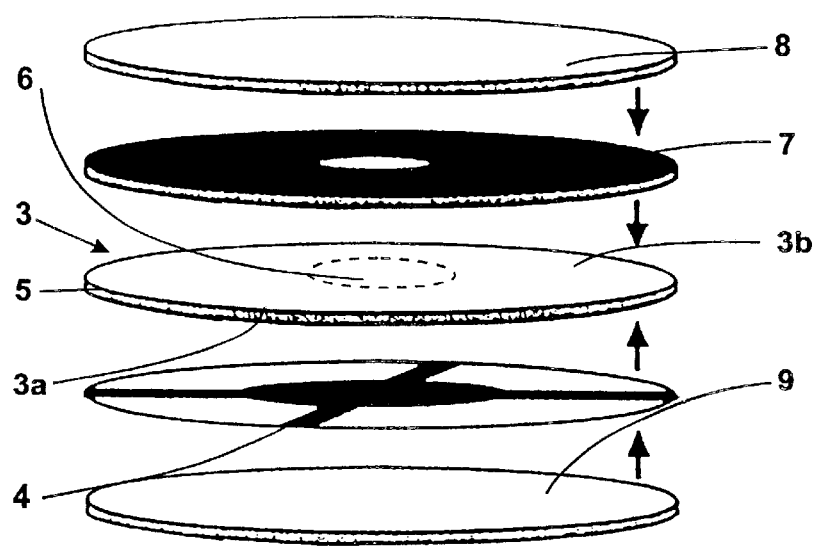
FIG. 1 is a schematic prospective exploded view of a preferred embodiment of a device according to the present invention.
Figure 2:
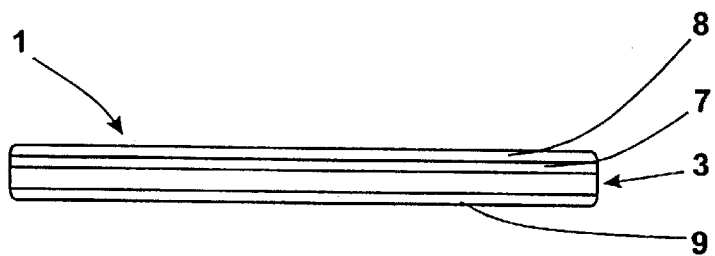
FIG. 2 shows a schematic lateral view of the device of FIG. 1.

With reference to FIGS. 1 and 2, numeral 1 indicates a first preferred embodiment of the device for detecting, assessing and signaling thawing of deep frozen products, which can be applied to the products.

The device 1 includes a stratified laminar disc which is to be applied, during product packaging, to the surface layer of frost naturally created on the product.

This disc 1 includes a first support 3, made of scarcely permeable material, preferably paper.

The lower surface 3a of the first support 3 has made thereon a pattern 4, which in FIG. 1 is shown separated from this support 3 for sake of clarity.

The pattern 4 extends from the outer edge zone 5 of the first support 3 up to its central part, where a display zone 6 is located and covers the latter.

The pattern 4 is formed by substances, applied by known techniques e.g. silk-screen printing, which facilitate expansion of water to the part of the first support 3 covered by this pattern.

These substances are a mixture of suitably dosed: surface-active substances; microcapsules of non hardened gelatin, containing non-toxic oily substances and made according to known techniques; viscousizing resins, which allow to apply the mixture to the first support 3.

Coloring water-soluble substances of known type are also applied, by known techniques, e.g. silk-screen printing, to the lower surface 3a, in the region of the display zone 6.

These substances react with liquid water, so as to assume a predetermined color.

Moreover, the disc 1 includes a second laminar support 7, fastened to the upper surface 3b of the first support 3, by e.g. gluing.

This second support 7 has the same shape as the first support 3 and its part 7a corresponding to the display area 6 of the first support 3 is transparent and preferably obtained by removing a portion of this second support 7.

The second support 7 has printed thereon information about the disc 1 and about its use.

Obviously, this information could be printed directly on the upper surface 3b of the first support 3, and in this case the second support 7 could be avoided.

The disc 1 has also transparent and impermeable films, respectively upper 8 and lower 9, of the same shape as the above mentioned first support 3 and fastened to the upper part of the second support 7 and to the lower part of the first support 3.

These films allow the first support 3 to get in contact with water only in the outer edge zone 5.

As has been previously said, the lower film 8 of the disc 1 is applied to the deep frozen product to control, in its part to be wrapped in a transparent material, immediately before the packaging of this product.

Thus, the information printed on the second support 7 can be immediately seen from outside, as well as the display zone 6 of the first support 3.

In this configuration, the coloring water-soluble substances are not seen from outside, because they are situated in the hidden lower surface 3a and because they do not change the color, as not in touch with water.

Water is not released until the surface temperature of the product remains below 0° C.

Otherwise, the surface frost covering the product melts and the released liquid water gets in contact with the outer edge zone 5 of the first support 3.

This makes the released water expand on this first support 3, preferably in the area of the pattern 4, due to the presence in the microcapsules, of surface-active substance and the non hardened gelatin, which tends to absorb water.

The speed of water expansion through the pattern 4 and subsequently, the period of time it needs to reach the display zone 6, depend on the pattern 4 length as well as on the concentration of the surface-active substances and the microcapsules.

Figure 3A:
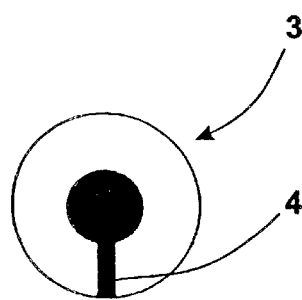
FIGS. 3a, 3b and 3c show schematic views of various possible arrangements of the active substance in the device of the previous Figures.
Figure 3B:
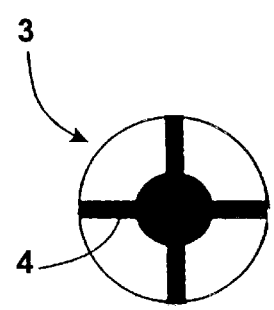
Figure 3C:
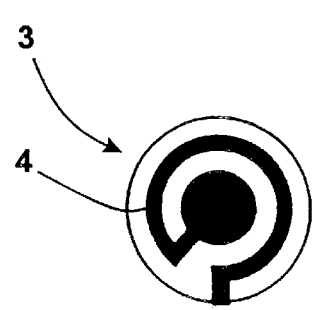

In fact, as shown in FIGS. 3a, 3b, 3c, the pattern 4 can have different shapes and lengths, so as to define precisely the period of time needed for reaching the display zone 6.

Therefore, if the product surface temperature remains over 0° C. for this predetermined period of time, the water reaches the display zone 6, where it reacts with coloring water-soluble substances, which assume a characteristic color.

Moreover, water solves the non hardened gelatin constituting the microcapsules and therefore, the oily substance contained therein is released and absorbed by the first support 3.

This makes the display zone of the first support 3 partially transparent and makes well seen from the outside of the disc 1, and consequently, from outside of the package, the color assumed by the coloring substances.

It is also evident that if the product surface temperature remains over 0° C. for a shorter period of time and then it goes down below 0° C. again, the water expansion through the pattern 4 stops before reaching the display zone 6, without causing effects seen from the outside, and starts again as soon as the temperature rises.

Therefore, the display zone 6 of the disc 1 is clearly colored only if the total period of thawing time has been longer than the water expansion time fixed for the given pattern 4.

The above mentioned microcapsules are particularly advantageous, however their presence is not indispensable for obtaining the objects of the present invention.

Anyway, if these microcapsules are present, the non hardened gelatin, from which they are made, being itself hydrophilic, further facilitates the water expansion.

Figure 4:
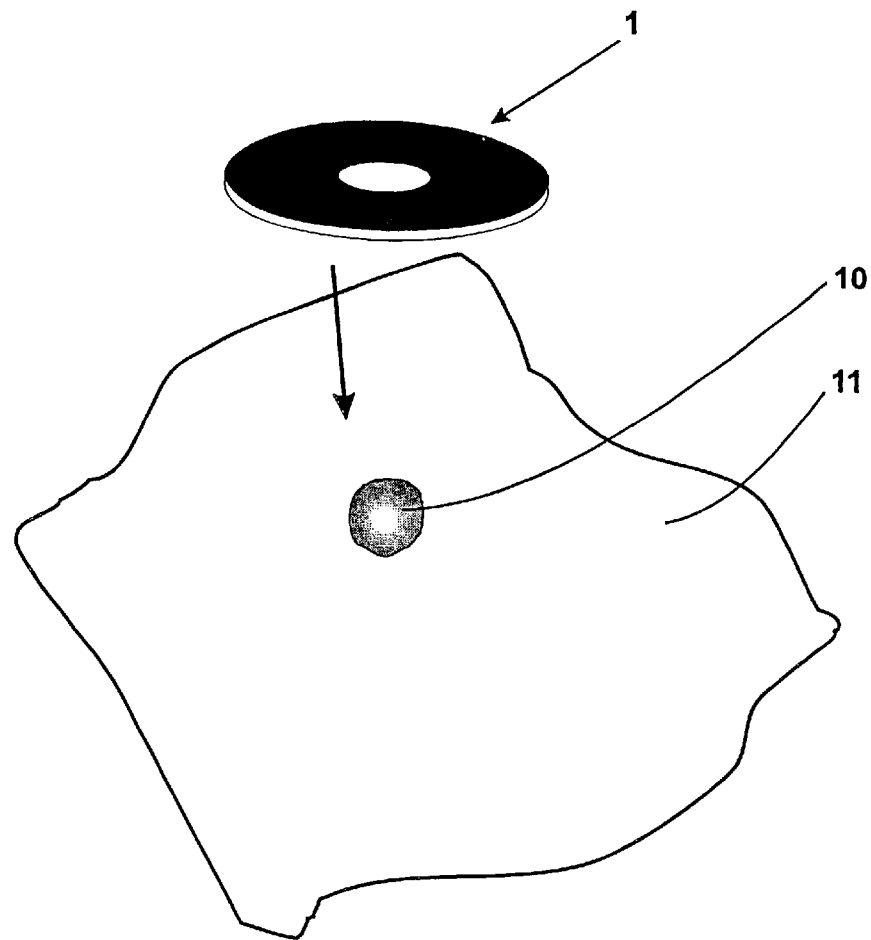
FIGS. 4 and 5 show two steps of the application of the device according to the present invention, in its second embodiment.
Figure 5:
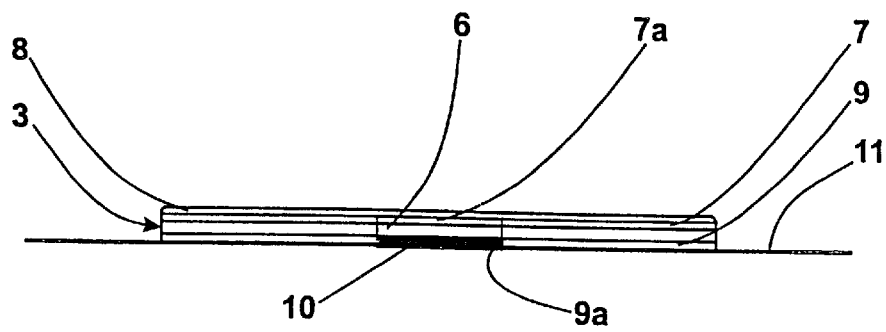

According to another embodiment, shown in FIGS. 4 and 5, the disc 1 includes a lower film 9 provided with a hole 9a in the region of the display zone 6 of the first support 3.

In this case, the substances facilitating the water expansion, as well as the substances containing coloring water-soluble agents, are applied to the lower surface 3a, only to the display zone 6.

As far as other characteristics are concerned, the disc 1 is identical with the one according to first embodiment.

According to the second embodiment, the disc 1 is preferably applied to the surface 11 of the product or its package, in an area, where liquid water is not released during thawing.

According to this embodiment, a drop of known gelatinizing agent 10 containing water, is placed on this surface 11 for gradual release of water.

This gelatinizing agent 10 acts also as a glue.

Subsequently, the disc 1 is applied to the surface 11 at the moment of the product packaging, with the drop of gelatinizing agent 10 situated exactly in the hole 9a of the lower film 9.

The outer surface of this lower film 9 can be also provided with a conventional adhesive, suitable for foodstuff, which improves the disc 1 adherence to the surface 11.

The drop of gelatinizing agent 10 does not release water, until the product surface temperature remains below 0° C.

When the temperature rises over 0° C., water is released gradually, depending on the composition of gelatinizing agent and anyway according to known course, which releases the oily substances contained in the microcapsules and activates the coloring water-soluble substances in the display zone 6.

This makes the display zone partially transparent and makes well seen the color assumed by the coloring substances on the upper part of the disc 1, after a certain period of time.

The main advantage of the present invention lies in fact that not only does it allow to detect even minimum interruptions of the freeze chain in the frozen or deep frozen product, but also signals visibly these interruptions only when the thaw condition has lasted long enough to make the product not advisable to be sold or used.

Another advantage of the present invention is that the above mentioned objects are obtained by a very cheap and highly reliable device of simple construction and application.

It is understood that what above has been described as a mere, non limitative example, therefore possible constructive variants remain within the protective scope of the present technical solution, as described above and claimed in the following.

What is claimed is:

1. Device for detecting, assessing and signaling thawing of deep frozen foodstuff, fit to be applied to an area of the product to be checked where liquid water is released during thawing, said device including:

a first support (3), made of laminar, water permeable material;

impermeable transparent films, upper (8) and lower (9) respectively, whose shape is identical to said first support (3), said upper and lower transparent films being respectively fastened to an upper surface (3b) and to a lower surface (3a) of said first support (3), so as to allow water to expand only from an outer edge zone (5);

said device being characterized in that said first support (3) comprises a display zone (6), made of material such that said display zone (6) becomes at least partially transparent when reached by water, and a pattern (4), situated in said lower surface (3a), extending from said outer edge zone (5) to said display zone (6), formed by substances for facilitating water expansion through said pattern (4), said first support (3) also comprising coloring water-soluble substances applied to said lower surface (3a) in the display zone (6).

2. Device, according to claim 1, characterized in that it includes also a second laminar support (7), situated between said first support (3) and upper film (8) and having dimensions as said first support (3), said second support (7) being provided with a transparent area (7a) located in alignment with said display zone (6) of said first support (3).

3. Device, according to claim 1, characterized in that said water expansion facilitating substances are a mixture comprising doses of: microcapsules of non hardened gelatin, containing non-toxic oily substances; surface-active substances; viscousizing resins.

4. Device, according to claim 1, characterized in that said water expansion facilitating substances and said water-soluble substances, applied to said first support (3), are in the form of a composition fit to be applied by silk-screen printing.

5. Device for detecting, assessing and signaling thawing of deep frozen foodstuff, fit to be applied to an area of the product to be checked where liquid water is released during thawing, said device comprising:

a first support (3), made of laminar, water permeable material;

impermeable transparent films, upper (8) and lower (9) respectively, whose shape is the same as said first support (3), said upper and lower impermeable transparent films being fastened to an upper surface (3b) and to a lower surface (3a) of said first support (3), said device being characterized in that:
- said first support (3) has a display zone (6), made of a material such that said display zone (6) becomes at least partially transparent when reached by water;
- said first support (3) is also provided with facilitating water expansion substances and with coloring, water-soluble substances, applied to said lower surface (3a) at said display zone (6), for facilitating the water expansion through said display zone (6) and for coloring the display zone when it is reached by water;
- said lower film (9) is moreover provided with a hole at said display zone (6);
- a predetermined quantity of gelatinous adhesive substance (10), containing water, is applied in the region of said hole (9a) for fastening said device (1) to a package (11) of frozen products.

6. Device, according to claim 5, characterized in that it includes also a second laminar support (7), situated between said first support (3) and upper film (8) and having dimensions as said first support (3), said second support (7) being provided with a transparent area (7a) located in alignment with said display zone (6) of said first support (3).

7. Device, according to claim 5, characterized in that said water expansion facilitating substances are a mixture comprising doses of: microcapsules of non hardened gelatin, containing non-toxic oily substances; surface-active substances; viscousizing resins.

8. Device, according to claim 5, characterized in that said water expansion facilitating substances and said water-soluble substances, applied to said first support (3), are in the form of a composition fit to be applied by silk-screen printing.

* * * * *